April 5, 1960 — G. PROSEN — 2,931,404
POTATO PEELING DEVICE
Filed March 10, 1958 — 2 Sheets-Sheet 1

INVENTOR.
Gildo Prosen
BY John F. Brezina
Att'y

April 5, 1960  G. PROSEN  2,931,404
POTATO PEELING DEVICE
Filed March 10, 1958  2 Sheets-Sheet 2
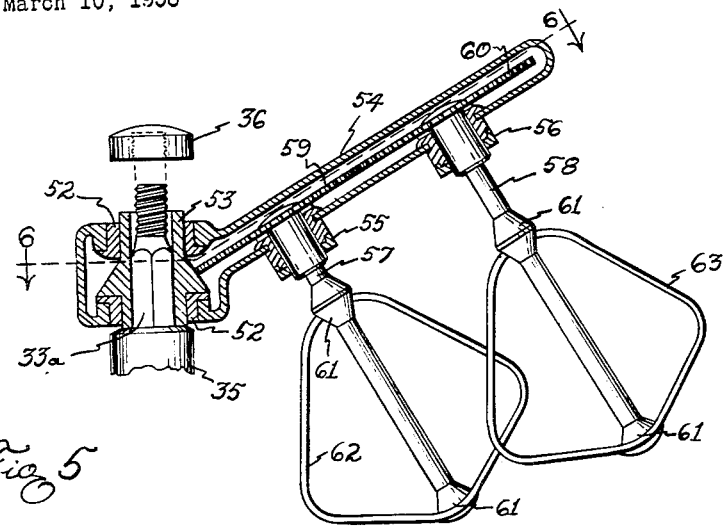
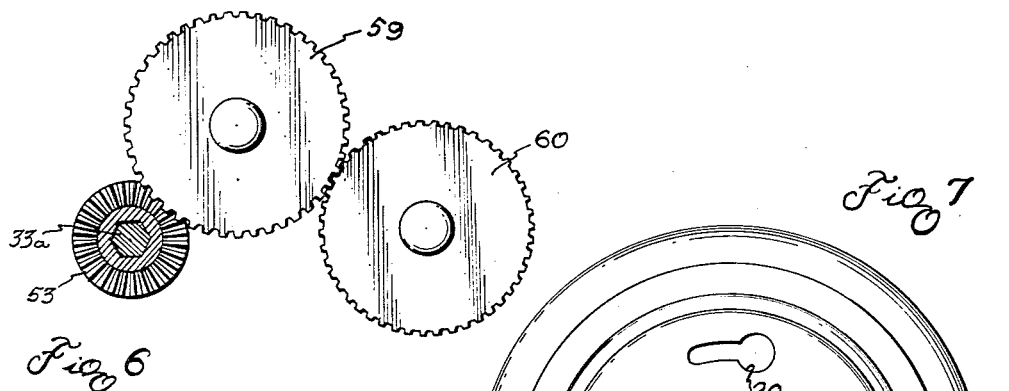
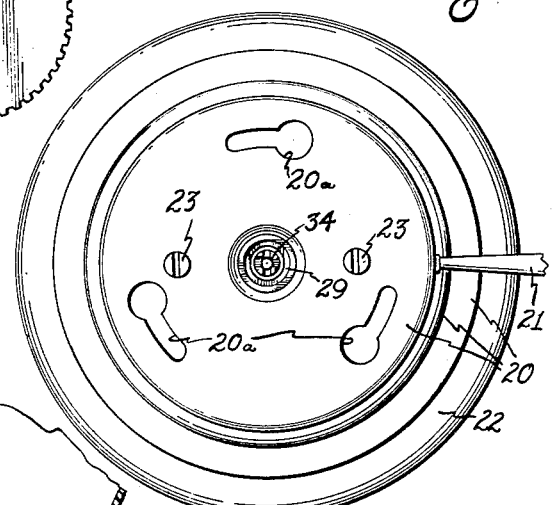
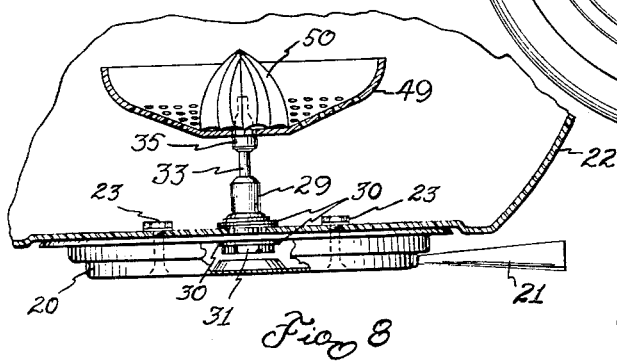
INVENTOR.
Gildo Prosen
BY John F. Brezina
Atty

United States Patent Office 2,931,404
Patented Apr. 5, 1960

2,931,404

POTATO PEELING DEVICE

Gildo Prosen, Chicago, Ill.

Application March 10, 1958, Serial No. 720,242

1 Claim. (Cl. 146—49)

This invention relates to portable electrically operated machines adapted for performing various operations on foods, and is directed to a novel combination of structural parts and features more fully hereinafter described.

It is an important object of my invention to provide electrical driven devices adapted for normal household use, which are adapted to save time and labor in food preparing and processing operations such as peeling, cutting, slicing, grinding, blending and mixing, and which includes a main bowl or receptacle having a journalled spindle fixedly mounted in the bottom thereof, and means for quickly coupling the same to a driven shaft, and novel means on the upper end of the spindle for releasably mounting one or more of a plurality of work elements which engage the vegetables or other food within a bowl or container.

It is an important object and accomplishment of my invention to provide a novel mounting member, normally secured to the bottom of a bowl or container having novel means for quickly and easily mounting and dismounting it from an upper portion of an electrically driven shaft and from the upper portion of a housing enclosing a motor.

To provide a novel separate bearing means secured to extend through the middle of the bottom of a container or bowl, and having a transmission shaft journalled therein and manually releasable means on its upper end for mounting and dismounting one of several work performing elements which engage the material placed in the bowl.

Other and further important objects of my invention will be apparent from the following description and appended claims.

On the drawings

Fig. 3 is an elevational view of a removable slicing member adapted to be mounted on the driven spindle, and adapted for cutting and slicing food such as vegetables, fruits, or the like.

Fig. 5 is an elevational view of a device for beating and mixing liquid materials, and adapted to be mounted on the driven spindle of my device.

Fig. 6 is a partially cross sectional and partially elevational view of the pinion and driven gears taken on a plane substantially indicated by the line 6—6 of Fig. 5.

Fig. 7 is a bottom plan view looking upwardly of the metal casing secured on the bottom of the bowl or container shown in Fig. 1.

Fig. 8 is a partially cross sectional and partially elevation view of the lower casing, the upper portion of the spindle and of a juice extracting device illustrated as mounted on said spindle.

Figure 1:
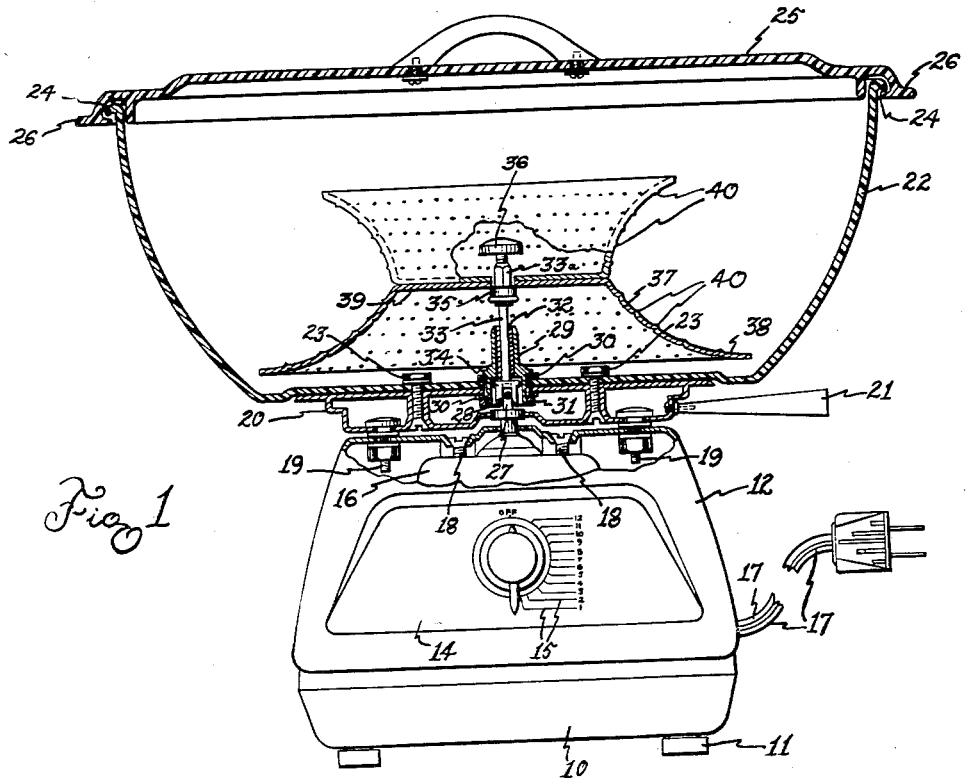
Fig. 1 is an elevational view of my novel device, with the intermediate and upper parts shown in cross section, and illustrating a foraminated potato peeling device removably and rotatably mounted within the receptacle.
Figure 2:
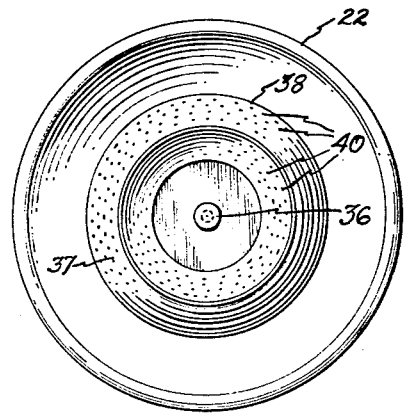
Fig. 2 is a reduced top plan view of said device, with the upper cover removed.

Referring to Fig. 1, numeral 10 designates a suitable metal base, which is preferably of substantially rounded form, as illustrated on aforesaid Fig. 1, and which is provided with a plurality of legs 11, which are suitably secured, for example by screws not shown, to the lower corner portions of said base 10. Said housing 12 is suitably apertured and carries a front face plate 14, which bears a plurality of suitably spaced graduations 15, which are adapted to indicate the different positions of a control switch hereinafter described. An electrically driven motor 16 having suitable circuit wires 17, with conventional plug, is suitably secured within the housing 12, and partially secured at its upper end by a pair of screws 18 as illustrated in Fig. 1, said screws extending through spaced holes in the upper portion of housing 12.

The housing 12 has a plurality, preferably two, spaced apart holes in its upper flat portion, in which holes are mounted a pair of annularly recessed headed metal bolts 19 which are secured in position by nuts as illustrated. The upper recessed heads of said bolts 19 project a short distance above the flat portion of the housing 12.

Numeral 20 designates a hollow metal apertured flanged shell or casing, which is preferably of annular form, and which has secured on its periphery a suitable handle 21. Said casing 20 has a plurality of spaced apart bayonet slots 20a in its lower wall, as illustrated in Fig. 7, which are spaced to receive and frictionally engage the upper portions of the heads of bolts 19, and partial rotation of said casing is adapted to releasably mount said casing 20 with respect to said bolts 19.

Secured on the upper flat wall portion of the casing 20 is a suitable upwardly opening receptacle, container or bowl 22, which preferably has a flat bottom in which a plurality of spaced apart apertures are formed. Bolts 23 are mounted in the passages through the casing 20 and through the openings in the bottom of container 22 to secure said casing 20 and said container 22 securely together.

The periphery of the container or bowl 22 preferably has an outwardly and downwardly extending integral flange 24, as partially illustrated in Fig. 1. A handle-carrying cover 25, which has an outer inwardly extending flange or rim 26 of flexible material such as rubber, rubber composition or the like, is adapted to be removably mounted on the periphery of said bowl or container and in engagement with flange 24. Said cover and said flange are preferably both formed of yieldable and flexible material such as soft plastic, rubber or the like.

The electric motor 15 is mounted with its armature shaft 27 in vertical position and with said shaft projecting a short distance within the casing 20, as illustrated in Fig. 1. The projecting end of said shaft carries a suitable stud or cross pin 28, as partially illustrated in Fig. 1.

The container or bowl 22 has a central bottom opening therein in which is mounted one end portion of a passaged metal journalling fitting or bearing member 29 which has an annular intermediate flange and whose lower portion is externally threaded. A pair of gaskets or washers 30 are mounted on bearing member 29, one of which is mounted between the flange of the member 29 and the bottom of container 22 and the other of which is mounted between the upper flat portion of casing 20 and said fitting. Said gaskets 30 are securely held in place by a lock nut 31, shown in cross section in Figs. 1 and 8. The lower portion of said fitting, with the aid of said gaskets, forms a tight seal to hold the upper portion of said fitting normally in a vertically extending position as illustrated in Figs. 1 and 8.

Mounted within the longitudinal passage of fitting 29 is a metal bearing sleeve 32 which is snugly mounted therein. A metal shaft or spindle 33 is journalled in the sleeve 32, has suitably mounted on its lower end a recessed hub or connection fitting 34 which said hub 34 is adapted to removably seat over the projecting end of the shaft 27, and adapted to be engaged by the stud or cross pin 28 so that rotation is transmitted through same from the armature shaft to said spindle or shaft 33.

The upper end portion 33a of the spindle 33 is of hexagon shape and the extreme upper end suitably threaded, and has mounted thereon an annular stop member 35. The said hexagonal upper end portion of shaft 33 is adapted to have removably mounted thereon any one of a plurality of passaged work elements or members, certain of which are hereinafter described and illustrated, such removable mounting being with the aid of a threaded bolt or knob 36 which is manually threaded on the upper threaded end of said spindle or shaft 33.

In Fig. 1 I have illustrated a device adapted for peeling potatoes and certain other vegetables, and which comprises a metal substantially bell-shaped member or body 37 which has an outwardly curved wall section and an outwardly and radially converging flange 38 and a plurality of outwardly extending projections 40 as illustrated, and which has a centrally apertured transverse wall 39. A second similar perforated work member or body 64 of substantially bell-shaped form and having an outwardly curved wall section terminating in an annular periphery, a plurality of small spaced apart projections and punchings and designated as 40, is secured with its enlarged opening extending upwardly in juxta-position with respect to the member 37, so that the projection-carrying annular curved walls of said members define a curved U-shaped path substantially as illustrated in Fig. 1 which will readily engage the rounded portions of potatoes or other vegetables.

Figure 3:
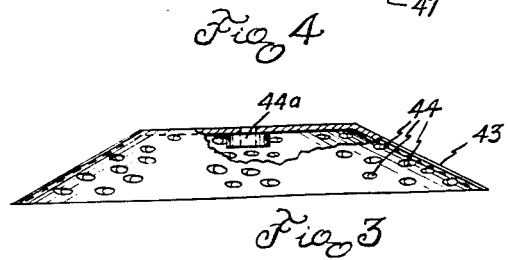

In Fig. 3 I have illustrated a metal device for grating vegetables or the like which comprises a frusto-conical metal perforated body 43 having a plurality of spaced apart punched openings 44, the portions of the body of said grater adjacent said punchings being pressed slightly outwardly to present a plurality of cutting or slicing edges. Said grater 43 has an upper centrally apertured wall connecting its integral wall and has a hub or ring 44a secured thereon to provide for quick and easy mounting thereof on the upper end of the driven spindle hereinbefore described, with the aid of knob 36. Said grater is adapted to cut and slice away surfaces or skin portions of rounded vegetables or fruits such as apples or the like.

Figure 4:
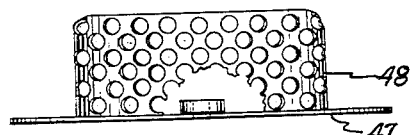
Fig. 4 is an elevational view of a mixing and agitating element adapted to be removably and rotatably mounted on the driven spindle of my machine.

In Fig. 4 I have illustrated a metal mixing, extracting and agitating attachment designated generally as 47 and having an upwardly extending dome 48 which has a plurality of apertures or perforations therein. Said mixing and extracting unit 47 has a passaged bearing 47a which is removably mounted on the hexagonal portion 33a of shaft 33.

In Fig. 8 I have illustrated a dish-like device for extraction of juices from citrus fruits or the like and which includes a perforated strainer 49 having a substantially conical fluted and flanged member 50 secured thereon. Strainer 49 has a central passage whereby it is removably mounted on the hexagonal portion 33a of shaft 33.

In Fig. 5 I have illustrated a mixing and beating attachment having a passaged hub 51 in which is suitably mounted, preferably with the aid of metal bearing rings 52, a passaged beveled pinion 53 whose passage conforms substantially to the non-round portion 33a of spindle 33. A relatively thin housing 54 has one end preferably formed integral with hub 51 and extends in an upwardly inclined direction as indicated in Fig. 5. The lower wall of said housing has 2 spaced apart apertures in which are pressed or otherwise suitably mounted a pair of journalling bearings 55 and 56, shown in cross section in Fig. 5.

As shown in Fig. 5 a pair of spindles or shafts 57 and 58 have their enlarged upper end portions journalled in bearings 55 and 56 respectively and said end portions of shafts 57 and 58 have a pair of gears 59 and 60 secured thereon and which are enclosed within housing 54. Gears 59 and 60 are in a common plane and mesh with each other, and gear 59 meshes with the teeth of beveled pinion 53 and is driven thereby.

Each of the shafts 57 and 58 have a pair of enlarged bosses 61 and metal beater frames 62 and 63 are suitably secured to said bosses.

The relative position of said beveled pinion 53 and gears 59 and 60 is illustrated in Fig. 6. It will be understood that the power driven rotation of spindle 33 will rotate pinion 53 to in turn rotate shafts 57 and 58 and the beaters 62 and 63, the shaft 58 and its beater 83 being rotated in a direction opposite to the direction of rotation of shaft 57 and its beater 62. It will be further understood that the housing and the rotating beaters may be easily rotated in a circular path within the bowl or receptacle containing the material to be mixed, whipped, agitated or the like, so that the entire body of the material is quickly subjected to the action of said beaters.

It will be understood that my said device may be adapted for performing a number of different kinds of work and operations, certain of which have been specifically mentioned herein. One of the most important of said operations is the peeling or removal of the skins of certain vegetables and is not only a great time and labor saver, but also avoids unnecessary waste as only the relatively thin peel or skin is removed in the manner described.

When using my device for peeling either potatoes or other soft-skinned vegetables, the user will place water in the bowl or container to the extent of not less than one-half thereof, this in addition to the potatoes. The water-soaking of the skin or peel softens same to facilitate an easy cutting and removal thereof, and the potatoes will rotate and agitate within the bowl and the removed pieces of peel or skin will remain separated from the bodies of the potatoes, and will be in suspension in the water.

A further advantageous result is the quick and easy removability and selective remounting on the driven spindle or shaft of the different work members, certain of which have been illustrated and herein referred to.

A further advantageous result is the quick and easy removability of the main bowl or receptacle with its transversely extending metal casing secured on the bottom thereof, and which is adapted to be quickly and easily dismounted from the illustrated position above the portable housing which encloses the motor and driving means.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claim.

I claim:

In a device adapted to perform cutting and peeling operations on vegetables or the like; an upwardly opening container having a central bottom opening; a passaged mounting casing secured on the bottom of said container, said casing having means for removably connecting the same to a stationary support; a bearing mounted in the central opening of said container; a stub shaft journalled in said bearing, said stub shaft having its upper portion extending above said bearing and being threaded; a metal peeling member removably mounted on the upper end of said stub shaft; said peeling member having a curved outwardly converging substantially bell-shaped lower portion having a plurality of projections thereon and having a flat wall and terminating in an annular peripheral flange and an upwardly opening substantially bell-shaped outwardly curved upper section having a plurality of projections thereon, the outer faces of said lower and upper sections defining a substantially annular curved path; and a nut on the upper end of said stub shaft for releasably mounting said peeling member on said shaft, and means on the lower end of said shaft for releasably engaging a power-driven shaft.

References Cited in the file of this patent

UNITED STATES PATENTS

| | | |
|---|---|---|
| 2,805,697 | Nieland | Sept. 10, 1957 |
| 2,844,176 | Barrows et al. | July 22, 1958 |

OTHER REFERENCES

Germany, appl. Ser. No. R 11,229, Mar. 24, 1956 (Kl. 34b 7₁₀).